US010502324B2

(12) United States Patent
Reilly et al.

(10) Patent No.: US 10,502,324 B2
(45) Date of Patent: Dec. 10, 2019

(54) VALVE WITH REMOVABLE SEAT

(71) Applicant: Victaulic Company, Easton, PA (US)

(72) Inventors: William J. Reilly, Langhorne, PA (US); Lawrence W. Thau, Jr., Flemington, NJ (US); Michael Davis, Kunkletown, PA (US); Michael Prince, Bethlehem, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 14/270,564

(22) Filed: May 6, 2014

(65) Prior Publication Data

US 2014/0332707 A1 Nov. 13, 2014

Related U.S. Application Data

(60) Provisional application No. 61/925,724, filed on Jan. 10, 2014, provisional application No. 61/820,202, filed on May 7, 2013.

(51) Int. Cl.
*F16K 3/02* (2006.01)
*F16K 1/226* (2006.01)
(Continued)

(52) U.S. Cl.
CPC .............. *F16K 3/0272* (2013.01); *F16K 1/22* (2013.01); *F16K 1/226* (2013.01); *F16K 3/0227* (2013.01);
(Continued)

(58) Field of Classification Search
CPC .... F16K 3/0272; F16K 3/0227; F16K 3/0281; F16K 1/226; F16K 43/00;
(Continued)

(56) References Cited

U.S. PATENT DOCUMENTS

| 384,849 A | 6/1888 | Hood | |
| 2,937,657 A * | 5/1960 | Miller | E03B 9/02 137/328 |

(Continued)

FOREIGN PATENT DOCUMENTS

| CN | 101109452 A | 1/2008 |
| CN | 101910697 A | 12/2010 |

(Continued)

OTHER PUBLICATIONS

Translation of JP 54-16743.*

(Continued)

*Primary Examiner* — Kevin F Murphy
*Assistant Examiner* — Kelsey E Cary
(74) *Attorney, Agent, or Firm* — Ballard Spahr LLP

(57) ABSTRACT

A valve has a housing defining an inlet and an outlet and a cavity therebetween which receives a valve seat. The valve seat defines a slot which receives a gate. The valve seat is sealingly engaged with the housing, the gate sealingly engages the valve seat and is movable within the slot between an open and a closed position using an actuator. An opening in the housing provides access to the cavity. The valve seat may be removed from the housing through the opening by attaching the valve seat to the gate, thereby attaching the valve seat to the actuator, and withdrawing the gate from the housing using the actuator.

14 Claims, 12 Drawing Sheets

(51) Int. Cl.
*F16K 43/00* (2006.01)
*F16K 1/22* (2006.01)

(52) U.S. Cl.
CPC ............ *F16K 3/0281* (2013.01); *F16K 43/00* (2013.01); *Y10T 137/7504* (2015.04); *Y10T 137/7668* (2015.04)

(58) Field of Classification Search
CPC ........ Y10T 137/7504; Y10T 137/7559; Y10T 137/76131; Y10T 137/7668; Y10T 137/6065; Y10T 137/6072; Y10T 137/6079; Y10T 137/6109
USPC ............... 251/326, 329, 328, 360, 361, 193; 137/454.2, 454.4, 454.5, 454.6, 315.27, 137/315.29, 315.31, 315.41
See application file for complete search history.

(56) References Cited

U.S. PATENT DOCUMENTS

| | | | |
|---|---|---|---|
| 3,194,259 | A | 7/1965 | Garrod |
| 3,223,381 | A | 12/1965 | Fischer et al. |
| 3,658,087 | A | 4/1972 | Nelson |
| 3,993,092 | A | 11/1976 | Still |
| 4,377,274 | A | 3/1983 | Mayhew, Jr. |
| 4,765,361 | A | 8/1988 | Clifford |
| 4,798,225 | A | 1/1989 | Hsiao |
| 5,020,776 | A * | 6/1991 | Owens ................. F16K 3/0281 251/327 |
| 5,174,615 | A * | 12/1992 | Foster ..................... F16L 23/16 285/334.2 |
| 5,364,066 | A | 11/1994 | Dorste et al. |
| 5,413,140 | A | 5/1995 | Kimpel et al. |
| 5,549,278 | A * | 8/1996 | Sidler ................... F16K 27/044 251/328 |
| 5,653,423 | A | 8/1997 | Young et al. |
| 5,890,700 | A | 4/1999 | Clarkson et al. |
| 6,010,115 | A | 1/2000 | Schlegel et al. |
| 6,079,442 | A | 6/2000 | Raymond, Jr. et al. |
| 6,422,535 | B1 | 7/2002 | Stone et al. |
| 6,431,518 | B1 | 8/2002 | Geiser |
| 7,600,739 | B2 | 10/2009 | Phillips et al. |
| 8,695,626 | B2 | 4/2014 | Murphy et al. |
| 2004/0124393 | A1* | 7/2004 | Shimomura .......... F16K 3/0227 251/328 |
| 2004/0217319 | A1 | 11/2004 | Reeves et al. |
| 2005/0098756 | A1 | 5/2005 | Gravningen et al. |
| 2005/0150550 | A1 | 7/2005 | Maichel et al. |
| 2007/0114483 | A1 | 5/2007 | Young et al. |
| 2008/0035876 | A1 | 2/2008 | Brenes et al. |
| 2008/0230124 | A1 | 9/2008 | Phillips et al. |
| 2008/0230125 | A1 | 9/2008 | Phillips et al. |
| 2009/0095933 | A1 | 4/2009 | McGuire et al. |
| 2009/0114872 | A1* | 5/2009 | Syvertsen ................ F16K 3/12 251/328 |
| 2009/0166573 | A1 | 7/2009 | Sakai et al. |
| 2011/0272617 | A1 | 11/2011 | Lah |
| 2012/0085957 | A1* | 4/2012 | Dhawan ................ F16K 3/0209 251/326 |
| 2013/0306175 | A1 | 11/2013 | Syversen |
| 2013/0334451 | A1 | 12/2013 | Blenkush et al. |
| 2013/0334453 | A1 | 12/2013 | Blenkush et al. |

FOREIGN PATENT DOCUMENTS

| | | |
|---|---|---|
| CN | 202048227 U | 11/2011 |
| CN | 102758926 A | 10/2012 |
| EP | 0895011 A2 | 2/1999 |
| GB | 2226103 | 6/1990 |
| GB | 2263157 | 7/1993 |
| JP | 54167432 | 5/1978 |
| JP | 54167432 | 11/1979 |
| JP | 5751079 | 3/1982 |
| JP | 2004124978 | 4/2004 |
| JP | 2006527339 | 11/2006 |
| JP | 2010121682 A | 6/2010 |
| WO | 2004109165 | 12/2004 |

OTHER PUBLICATIONS

Copenheaver, Blaine R.; International Search Report from corresponding International Patent Application No. PCT/US2014/036918; dated Sep. 24, 2014; pp. 1-2; United States Patent and Trademark Office as International Search Authority; Alexandria, Virginia, USA.

Copenheaver, Blaine R.; Written Opinion of the International Searching Authority from corresponding International Patent Application No. PCT/US2014/036918; dated Sep. 24, 2014; pp. 1-14; United States Patent and Trademark Office as International Search Authority; Alexandria, Virginia, USA.

Author Unknown; Knife Gate Valve SLV; Stafsjo Catalog; Jun. 28, 2012; 8 pages.

Author Unknown; Knife Gate Valves for Water, Sludge and Abrasive Slurry; Stafsjo Catalog; Dec. 30, 2011; 8 pages.

Author Unknown, English translation of Search Report from counterpart Chinese patent application No. 201480025947.6, dated Oct. 14, 2016, pp. 1-3, translation prepared by China Patent Agent (H.K.) Ltd, 22/F., Great Eagle Center, 23 Harbour Road, Wanchai, Hong Kong.

Reinhold, Becker; Supplementary European Extended Search Report from counterpart European patent application No. 14794784, dated Nov. 14, 2016, pp. 1-2, European Patent Office, Munich, Germany.

Reinhold, Becker; Search Opinion from counterpart European patent application No. 14794784, dated Nov. 14, 2016, pp. 1-4, European Patent Office, Munich, Germany.

Author Unknown; English Translation of and Office Action from counterpart Japanese patent application No. 2016-513005; dated Jan. 19, 2018; English Translation pp. 1-18; Translated by Shusaku-Yamamoto, Osaka, Japan.

* cited by examiner

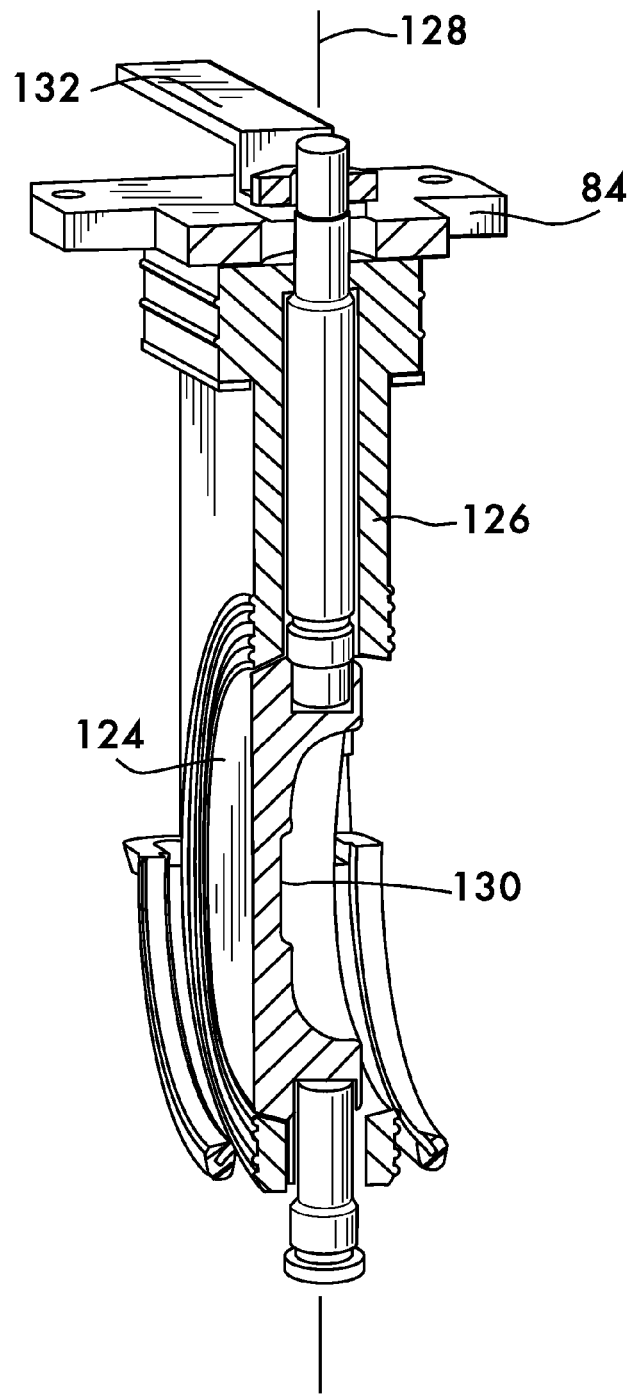

VALVE WITH REMOVABLE SEAT

CROSS REFERENCE TO RELATED APPLICATIONS

This application is based upon and claims priority to U.S. Provisional Application No. 61/820,202, filed May 7, 2013 and U.S. Provisional Application No. 61/925,724 filed Jan. 10, 2014, both applications being hereby incorporated by reference herein.

FIELD OF THE INVENTION

This invention concerns valves used in high wear environments.

BACKGROUND

In hydraulic fluid handling valve applications there are many different fluid media to be considered, including, for example, water, various chemicals, as well as thick, highly abrasive fluids commonly called slurry. Slurries can have different levels of solid content as well as particle sizes. Because slurries have a higher level of solids content than typical hydraulic fluids, they present unique operational difficulties such as increased wear rate of piping and valves in systems transporting slurry.

Because of the increased wear rate on components caused by the slurry, it is typical for systems transporting slurry to have predetermined maintenance schedules for the replacement of worn parts such as seals, valve seats, and other components subject to wear. Such maintenance usually requires shut down of the affected hydraulic lines and results in the loss of production.

Typical valves used in slurry applications are pinch and knife gate valves which are designed specifically for the increased solid content of the fluid and the resultant greater wear on components. In order to service these types of valves it is necessary to remove either the entire valve or significant sections of pipe attached to the valve, resulting in increased down time of the production line and loss of associated revenue.

There is a clearly a need for components, such as valves, that can be serviced in a faster and more efficient manner to reduce production down time and the concomitant loss of revenue.

SUMMARY

The invention concerns a valve. In one example embodiment, the valve comprises a housing having an inlet and an outlet. A cavity is positioned within the housing between the inlet and the outlet. A first opening in the housing provides access to the cavity. A valve seat is positioned within the cavity and sealingly engages the housing. The valve seat is insertable into and removable from the cavity through the first opening. A valve closing member is mounted within the valve seat and is movable relatively thereto between an open position and a closed position sealingly engaging the valve seat. A first actuator is mounted on the housing and is engageable with the valve seat for removing the valve seat and the valve closing member from the cavity through the first opening.

In another example, the valve may further comprise a second actuator mounted on the housing. The second actuator is engaged with the valve closing member for moving the valve closing member between the open and the closed positions. In a particular example, the valve closing member comprises a body rotatably mounted within the valve seat, and the body is rotatably movable between the open and the closed positions. By way of example, the valve closing member in this embodiment comprises a disk.

In a further example embodiment, the first actuator is engageable with the valve closing member separately from the valve seat for moving the valve closing member between the open and the closed positions. In a particular example, the valve closing member comprises a gate slideably mounted within the valve seat, the gate being slidably movable between the open and the closed positions. By way of further example, the gate maybe pivotably attached to the first actuator or slidingly attached to the first actuator.

By way of example, the cavity may be defined by first and second walls positioned within the housing and oriented transversely to a flow axis extending from the inlet to the outlet. The first and second walls are in spaced relation to one another, each wall having a surface facing toward and sealingly engaged with the valve seat. In a further embodiment, the valve seat comprises first and second sealing surfaces positioned in facing relation to one another and defining a slot therebetween. The valve closing member may comprise a gate slidably movable within the slot between the open and closed positions. The gate in this example is oriented transversely to the flow axis and has first and second oppositely disposed faces respectively sealingly engaging the first and second sealing surfaces of the valve seat.

By way of example, the valve may further comprise a strap attachable to the gate for retaining the valve seat to the gate, thereby attaching the valve seat to the actuator to facilitate removal thereof from the cavity. In an example embodiment, the first actuator comprises a jackscrew.

In a particular example embodiment, the housing comprises a first segment defining the first opening and a second segment attached to the first segment. The first and second segments are attached to one another end to end and define the inlet and the outlet and a flow axis extending therebetween. Additionally by way of example, each of the first and second segments comprises first and second lugs projecting outwardly from opposite ends thereof. The lugs each have at least one hole for receiving a fastener for attaching the segments to one another.

In a further example embodiment, each of the first and second segments comprises first and second arcuate projections positioned on opposite sides of the segments. The first and second arcuate projections surround the flow axis and extending radially there toward.

Further by way of example, each of the first and second segments comprises first and second grooves positioned on opposite sides of the segments, each of the grooves facing the flow axis. First and second gaskets are respectively positioned within the first and second grooves. In one example embodiment, the first and second grooves extend over interfacing surfaces of the first and second lugs of the first and second segments. The first and second gaskets also extend along the first and second grooves in the lugs.

In an example embodiment, the inlet has an inner diameter and the valve seat defines an aperture having an inner diameter smaller than the inner diameter of the inlet thereby defining a sealing surface facing the inlet. The sealing surface may comprise at least one projection extending toward the inlet. Further by way of example, the outlet may have an inner diameter and the valve seat may define an aperture having an inner diameter smaller than the inner diameter of the outlet thereby defining a sealing surface facing the outlet. In an example embodiment, the sealing surface comprises at least one projection extending toward the outlet.

By way of example, the valve may further comprise a second opening in the housing providing access to the cavity. In a particular example embodiment, the second opening is positioned opposite to the first opening.

Another example further comprises a sealing body attachable to the valve seat. The sealing body is movable into the cavity through the second opening upon removal of the valve seat through the first opening. In an example embodiment, the sealing body comprises first and second sealing surfaces oppositely disposed from one another and sealingly engageable with the housing. In another example embodiment, the sealing body comprises a plurality of portions removably attachable to one another. For example, the sealing body may comprise a rectangular block.

By way of further example, the valve seat may comprise a plurality of independent piece parts attachable to one another. An additional example may further comprise a pivot hinge mounted on the housing. The first actuator is mounted on the pivot hinge and is pivotably movable thereon relatively to the housing in this example.

In another example embodiment, a valve comprises a housing having an inlet and an outlet. The housing comprises first and second segments. The first and second segments are attached to one another end to end and define the inlet and the outlet and a flow axis extending therebetween. A cavity is positioned within the housing between the inlet and the outlet. A first opening is positioned in the first segment, and a second opening is positioned in the second segment. The first and second openings provide access to the cavity. A valve seat is positioned within the cavity and sealingly engages the housing. The valve seat is insertable into and removable from the cavity through one of the first and second openings. A valve closing member is mounted within the valve seat and is movable relatively thereto between an open position and a closed position sealingly engaging the valve seat. A first actuator is mounted on the housing and engageable with the valve seat for inserting and removing the valve seat and the valve closing member into and from the cavity through one of the first and second openings.

In a particular example, each of the first and second segments comprises first and second lugs projecting outwardly from opposite ends thereof, the lugs each having at least one hole for receiving a fastener for attaching the segments to one another. Further by way of example, each of the first and second segments comprises first and second arcuate projections positioned on opposite sides of the segments. The first and second arcuate projections surround the flow axis and extending radially there toward.

In an example embodiment, each of the first and second segments comprises first and second grooves positioned on opposite sides of the segments. Each of the grooves faces the flow axis in this example. First and second gaskets are respectively positioned within the first and second grooves. In a particular example, the second opening is positioned opposite to the first opening. By way of example, the gate may be pivotably attached to the first actuator. Another example embodiment further comprises a second actuator mounted on the housing. The second actuator is engaged with the valve closing member for moving the valve closing member between the open and the closed positions. By way of example, the valve closing member comprises a body rotatably mounted within the valve seat, the body being rotatably movable between the open and the closed positions. In a particular example, the valve closing member comprises a disk.

In an example embodiment, the first actuator is engageable with the valve closing member separately from the valve seat for moving the valve closing member between the open and the closed positions. By way of example, the valve closing member comprises a gate slideably mounted within the valve seat. The gate is slidably movable between the open and the closed positions.

An example embodiment further comprises a sealing body attachable to the valve seat. The sealing body is movable into the cavity through the second opening upon removal of the valve seat through the first opening. In a particular example, the sealing body comprises first and second sealing surfaces oppositely disposed from one another and sealingly engageable with the housing. In a further example, the sealing body comprises a plurality of portions removably attachable to one another. By way of example, the sealing body may comprise a rectangular block.

In another example embodiment, the valve seat comprises a plurality of independent piece parts attachable to one another.

By way of example, a pivot hinge is mounted on the housing. The first actuator is mounted on the pivot hinge and is pivotably movable thereon relatively to the housing. Another example embodiment of a valve comprises a housing having an inlet and an outlet. The housing comprises first and second segments. The first and second segments are attached to one another end to end and defining the inlet and the outlet and a flow axis extending therebetween. In this example a cavity is positioned within the housing between the inlet and the outlet. A first opening is positioned in the first segment and providing access to the cavity. A valve seat is positioned within the cavity and sealingly engages the housing. The valve seat comprises a first piece part positioned within the first segment and a second piece part positioned within the second segment. The first piece part of the valve seat is insertable into and removable from the cavity through the first opening. A valve closing member is mounted within the valve seat and movable relatively thereto between an open position, and a closed position sealingly engaging the valve seat. A first actuator is mounted on the housing and engageable with the first piece part of the valve seat for inserting and removing the first piece part of the valve seat and the valve closing member into and from the cavity through the first opening.

In one example embodiment, the cavity is defined by first and second walls positioned within the housing and oriented transversely to a flow axis extending from the inlet to the outlet. The first and second walls are in spaced relation to one another. Each wall has a surface facing toward and sealingly engaged with the valve seat.

In an example, the first piece part of the valve seat comprises first and second sealing surfaces positioned in facing relation to one another and defining a slot therebetween. The valve closing member comprises a gate slidably movable within the slot between the open and closed positions in an example embodiment. The gate is oriented transversely to the flow axis and has first and second oppositely disposed faces respectively sealingly engaging the first and second sealing surfaces of the first piece part of the valve seat.

An example embodiment may further comprise a strap attachable to said gate for retaining said valve seat to said gate, thereby attaching the valve seat to the actuator to facilitate removal thereof from the cavity.

The invention also encompasses a method of removing a valve seat from a valve. The valve has a closing member engaging the valve seat. An actuator engages the valve closing member. An example method comprises:
  attaching the valve seat to the valve closing member;
  drawing both the valve seat and the valve closing member from the valve using the actuator engaging the valve closing member.

A method of replacing a valve seat is also contemplated. The valve has a closing member engagable with the valve seat and an actuator engaging the valve closing member. An example method comprises:
  engaging the valve seat with the closing member;
  moving both the valve seat and the valve closing member into the valve using the actuator engaging the valve closing member.

The invention further encompasses a method of replacing a valve seat in a valve using a blocking body. In a particular example, the method comprises:
  attaching the blocking body to the valve seat;
  drawing the valve seat from the valve while drawing the blocking body into the valve;
  detaching the valve seat from the blocking body;
  attaching a new valve seat to the blocking body;
  inserting the new valve seat into the valve while forcing the blocking body from the valve.

BRIEF DESCRIPTION OF THE DRAWINGS

FIG. 11 is a partial isometric sectional view of an example embodiment of a valve seat and valve closing member according to the invention.

DETAILED DESCRIPTION

Figure 1:
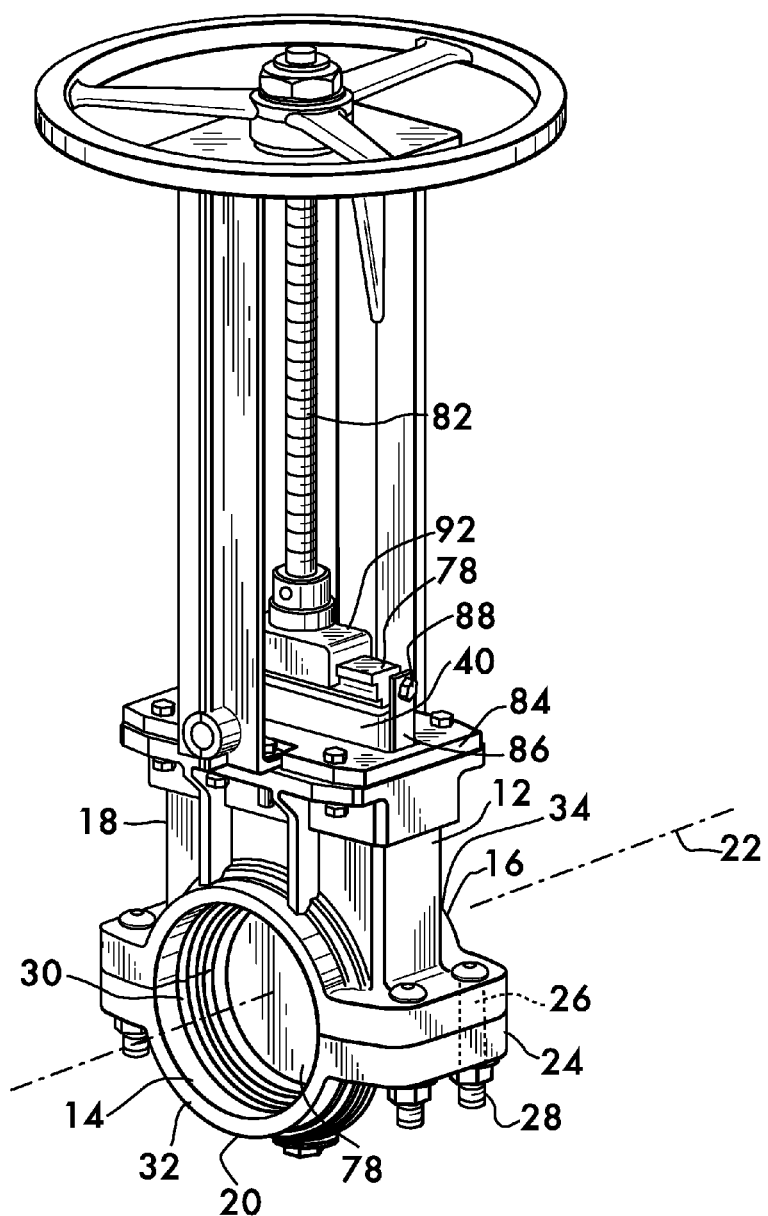
FIG. 1 shows an isometric view of an example valve embodiment according to the invention.

FIG. 1 shows an example embodiment of a valve 10 according to the invention. Valve 10 comprises a housing 12 having an inlet 14 and an outlet 16. Housing 12 may be formed from a metal such as ductile iron, cast iron or steel, composites such as fiberglass, and polymers such as PVC (polyvinylchloride). Housing 12 comprises a first segment 18 and a second segment 20 attached to one another end to end and thereby define the inlet 14, the outlet 16, and a flow axis 22 extending between them. In this example embodiment the segments 18 and 20 have projecting lugs 24 each having one or more aligned holes 26 that receive fasteners 28 for attaching the segments to one another. When used to connect grooved pipe elements (see FIG. 2) the segments will have arcuate projections 30 (also known as "keys") positioned on opposite sides 32 and 34 of the segments 18 and 20. The arcuate projections 30 surround and face the flow axis 22 and extend radially toward it, allowing them to engage circumferential grooves within the pipe elements and provide mechanical engagement to retain the pipe elements to the valve 10.

Figure 2:
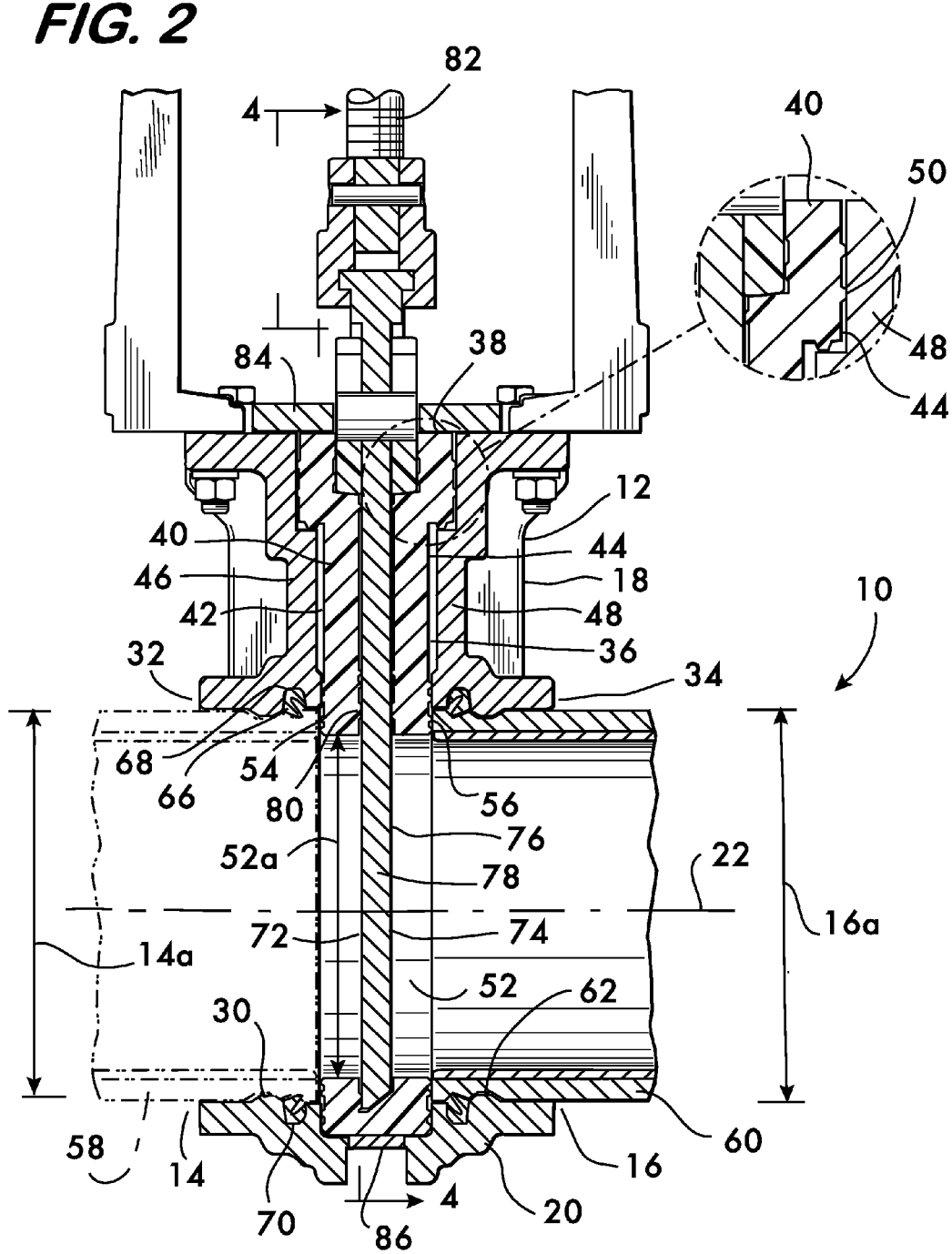
FIGS. 2 and 3 show longitudinal sectional views of a portion of the valve shown in FIG. 1.

As shown in FIG. 2, a cavity 36 is positioned within the housing 12 between the inlet 14 and the outlet 16. A first opening 38 within the first segment 18 provides access to cavity 36. A valve seat 40 is positioned within the cavity 36. Valve seat 40 may be advantageously formed from a resilient, flexible material such as a rubber compound or urethane. The valve seat is insertable into the cavity 36 through the opening 38 and sealingly engages the housing. In this example embodiment, sealing engagement between seat 40 and housing 12 is effected through contact between oppositely facing surfaces 42 and 44 of the valve seat respectively engaging first and second housing walls 46 and 48. Walls 46 and 48 are oriented transversely to the flow axis 22 and are in spaced relation from one another to define the cavity 36. Upon insertion into cavity 36, the valve seat 40 is compressed between the walls 46 and 48 to effect a seal at the engaging surfaces. Note that it may be advantageous to position projections 50 on the surfaces 42 and 44 to ensure a uniform compression, and hence, a fluid tight seal, between valve seat 40 and housing 12.

Figure 2A:
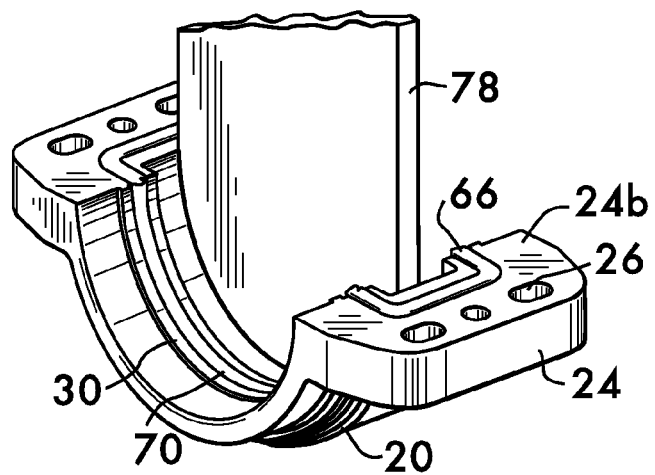
FIGS. 2A and 2B show portions of the valve of FIG. 1 in isolation.
Figure 2B:
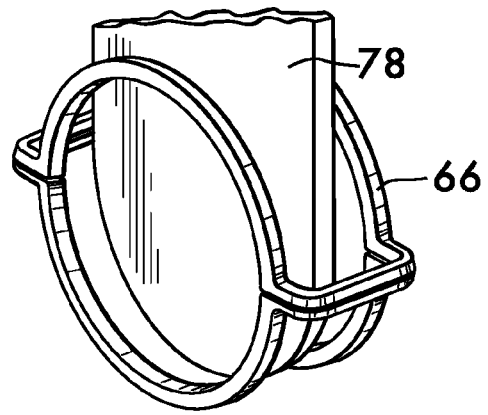
Figure 3:
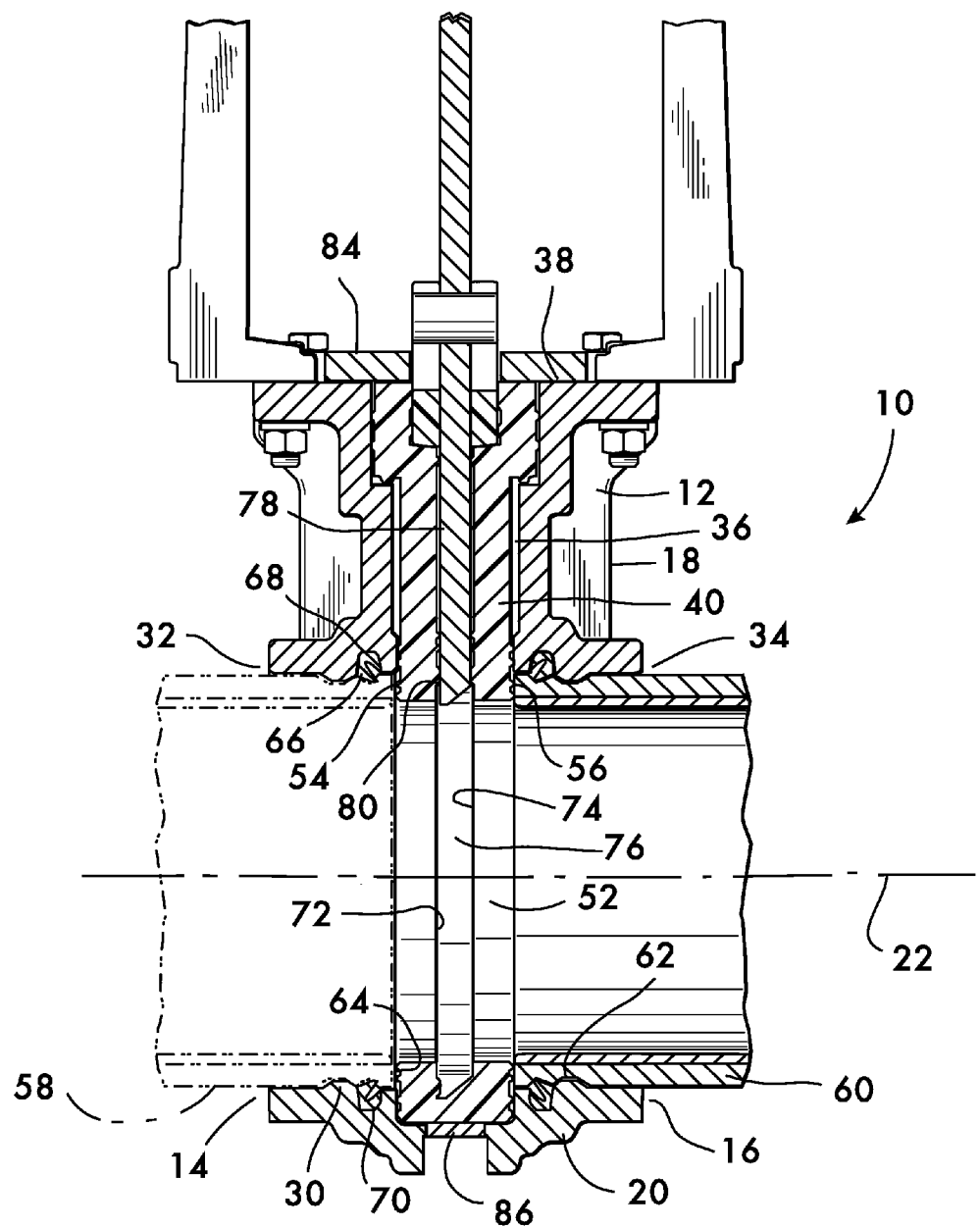
Figure 4:
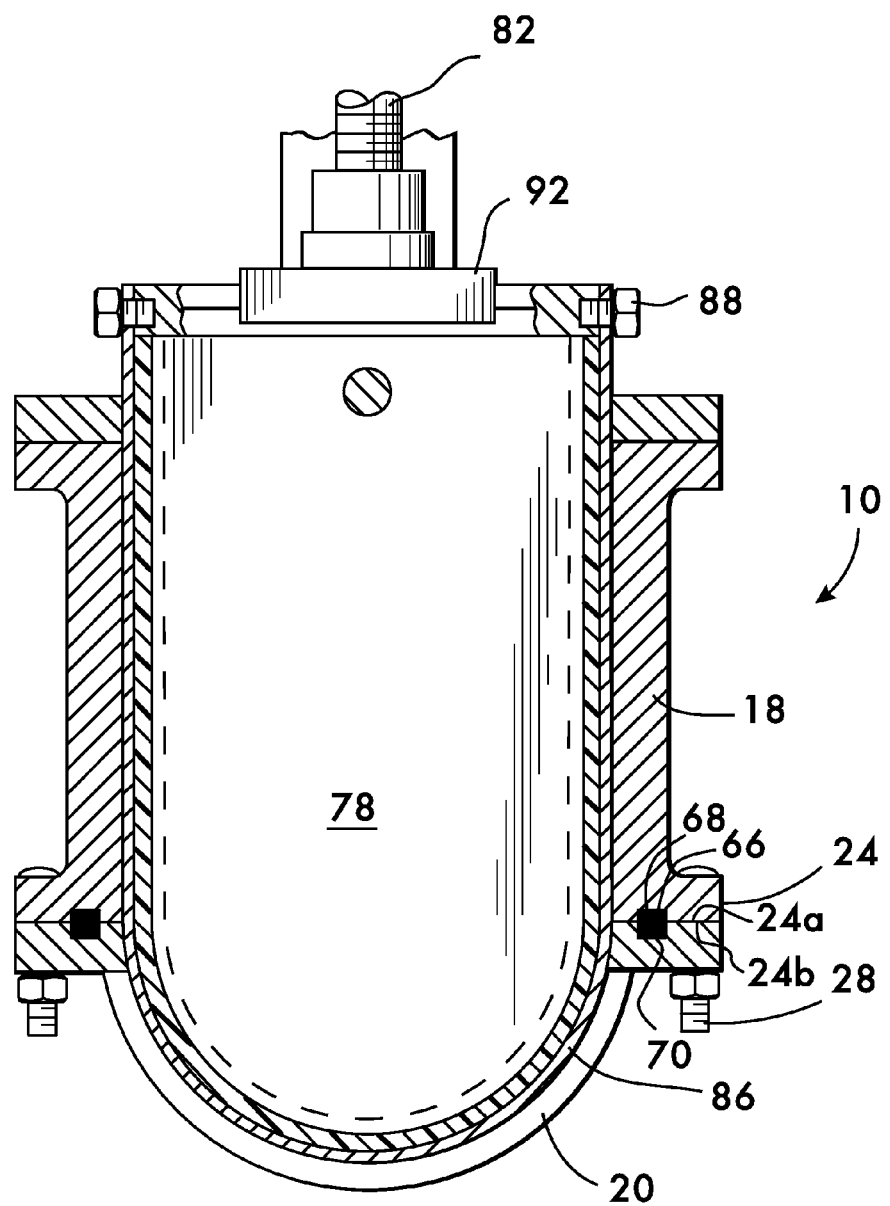
FIG. 4 shows a cross sectional view taken at lines 4-4 of FIG. 2.

Inlet 14 and outlet 16 each have respective inner diameters 14a and 16a which are substantially aligned with an aperture 52 defined by the valve seat. Together the inlet 14, outlet 16 and aperture 52 define the flow axis 22 through the valve 10. In the example shown, the aperture 52 of the valve seat 40 has an inner diameter 52a less than the respective inner diameters 14a and 16a of the inlet 14 and the outlet 16. This difference in diameters creates two axial sealing surfaces, sealing surface 54, which faces inlet 14, and sealing surface 56, which faces outlet 16. As shown in FIGS. 2 and 3, axial sealing surfaces 54 and 56 engage the ends of pipe elements 58 and 60 joined by the valve 10. Compression between the ends of pipe elements 58 and 60 and the axial sealing surfaces 54 and 56 is provided by the positions of arcuate projections 30 and the pipe element's circumferential grooves 62. Axial projections 64 positioned respectively on the sealing surfaces 54 and 56 and extending respectively toward the inlet 14 and outlet 16 may be used to ensure a uniform seal between the pipe elements 58 and 60 and the seat 40. Additional or alternate sealing between the pipe elements 58 and 60 and the housing may be effected by gaskets 66 positioned in respective grooves 68 and 70 in the segments 18 and 20. Grooves 68 and 70 are positioned on opposite sides 32 and 34 of the segments and face the flow axis 22. Gaskets 66 engage the segments and the pipe elements to effect a fluid tight seal therebetween. As shown in FIGS. 2A, 2B and 4, grooves 68 and 70 and gaskets 66 may also extend along the interfacing surfaces 24a and 24b of lugs 24. This seal configuration is shown in FIG. 2B in isolation to demonstrate how the seals 66 engage one another and form a complete sealing boundary to eliminate any potential leak paths between segments 18 and 20.

As shown in FIG. 3, valve seat 40 comprises first and second sealing surfaces 72 and 74 arranged spaced apart from one another in facing relation to define a slot 76. A valve closing member in the form of a gate 78 is slidably movable within slot 76 between a closed position (shown in FIG. 2) wherein gate 78 sealingly engages the sealing surfaces 72 and 74 and obstructs flow through the aperture 52, and an open position (shown in FIG. 3) which permits flow between the inlet 14 and outlet 16. Gate 78 may be made of metal, for example, steel, as well as composites such as fiberglass, as well as polymers such as HDPE (high density polyethylene). Gate 78 is in compressive engagement with sealing surfaces 72 and 74 when in the closed position. To ensure a uniform seal between the gate 78 and the valve seat 40, it is advantageous to position circumferential projections 80 on the surfaces 72 and 74.

Figure 5:
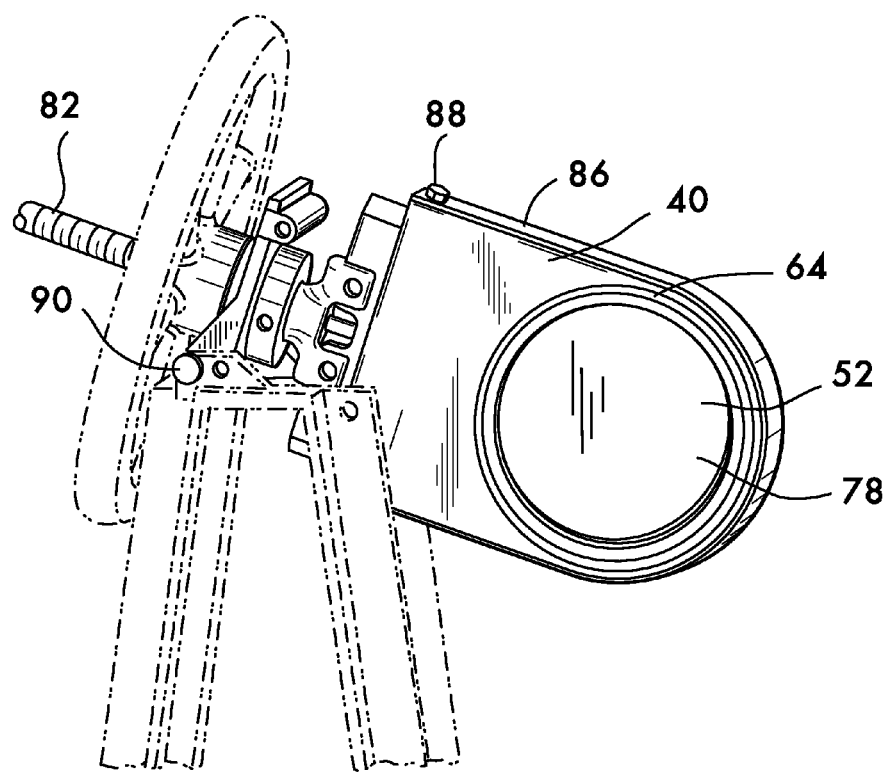
FIGS. 5 and 6 are isometric views showing example embodiments of portions of valves according to the invention.
Figure 6:
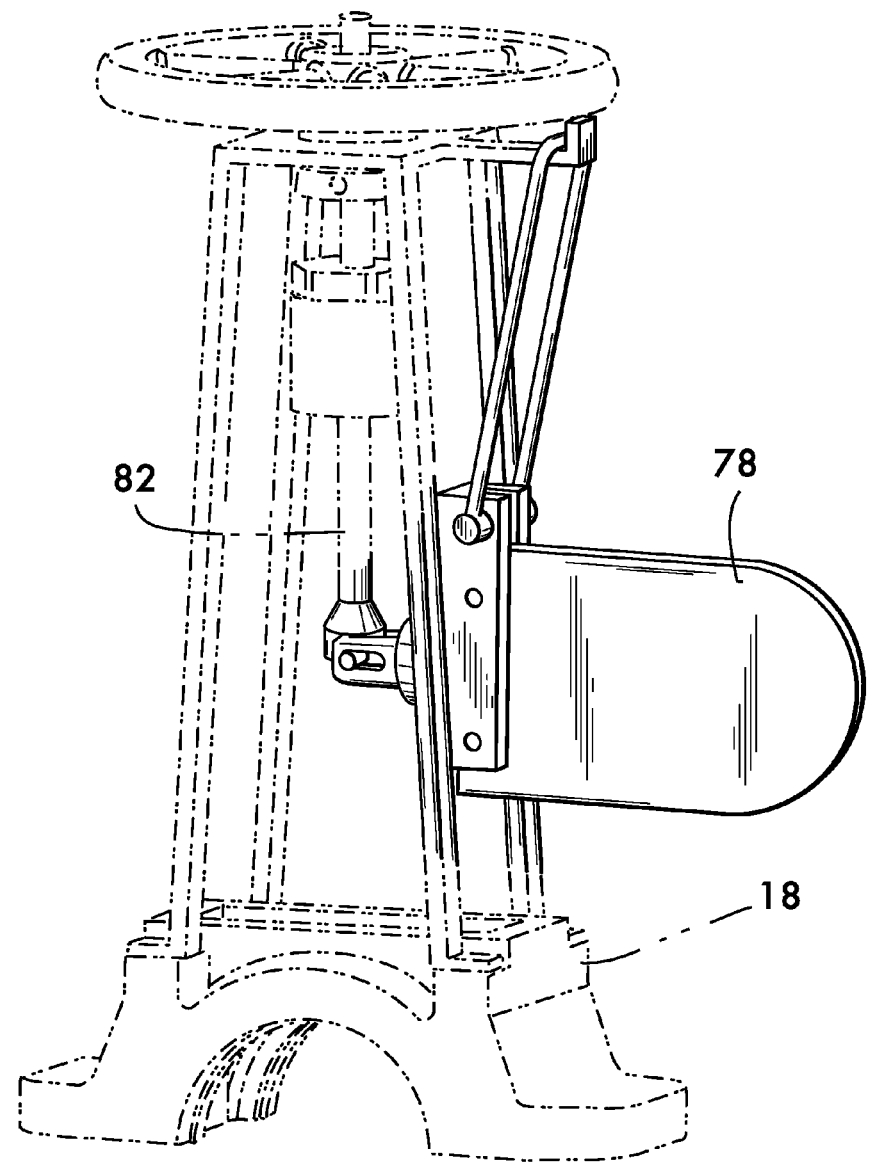

Movement of gate 78 is effected by an actuator, in this example a rising stem jackscrew 82 (see FIG. 1) mounted on the first segment 18 of the housing 12. Other types of actuators, such as pneumatic actuators, hydraulic actuators and electrical actuators, are also feasible. The shaft of jackscrew 82 engages the gate 78 separately from the valve seat 40, and rotation of the jackscrew's actuation wheel moves the jackscrew shaft, which moves the gate within the slot 76 of valve seat 40 between the open and closed positions as shown in FIGS. 2 and 3. The seat 40 is advantageously held within the cavity 36 by a retainer plate 84 removably fastened to the housing 12, otherwise, the considerable friction between the gate 78 and the sealing surfaces 72 and 74 (see FIG. 3) might remove the valve seat 40 from the cavity when the gate 78 is drawn away from the housing 12. However, the actuator (jackscrew 82) may be engaged with both the valve closing member (gate 78) and the valve seat 40 to intentionally remove both the gate and the valve seat from the cavity 36. This permits ready replacement of a worn valve seat without removing the valve 10 from the pipe elements 58 and 60. Seat replacement may be effected by removing the retainer plate 84 to permit the valve seat 40 to move through the opening 38 in the segment 18. Actuation of the jackscrew 82 to withdraw the gate 78 from the slot 76 may, instead, remove the valve seat 40 from cavity 36 provided that the friction between the gate and the valve seat is greater than the friction between the valve seat and the housing 12. However, it is advantageous to provide mechanical engagement between the actuator 82 and the valve seat 40 to ensure removal as desired. To this end, as shown in FIGS. 1 and 4, a strap 86 is positioned surrounding the valve seat 40 within the cavity 36. Strap 86 may be attached to the gate 78 using, for example, bolts 88 to provide mechanical engagement permitting the valve seat 40 to be withdrawn from cavity 36 with the gate 78 using the actuator. As shown in FIG. 5, to further facilitate valve seat replacement, the actuator, jackscrew 82, may be mounted on a pivot hinge 90 to permit pivoting motion of the gate 78 and valve seat 40 for ready access. The worn valve seat 40 may then be removed from the gate 78 by unbolting strap 86, sliding the worn valve seat from the gate, sliding a new valve seat onto the gate, bolting the strap 86 to the gate, rotating the jackscrew 82 on pivot hinge 90 to align the gate and valve seat with opening 38 (see FIGS. 2 and 3), and then using the jackscrew to force the new valve seat into the cavity 36. Once the valve seat is properly seated within the cavity 36 the bolts 88 may be removed and the retainer plate 84 may be reattached to the segment 18. In another embodiment, shown in FIG. 6, the gate 78 may be pivotably attached to the actuator, in this example, jackscrew 82. Still another embodiment is shown in FIG. 1, wherein gate 78 is slidingly attached to the actuator (jackscrew 82) using a "Tee" coupling 92 which permits both the gate 78 and valve seat 40 to be removed as an assembly when they are drawn from the cavity 36. The assembly slides along an axis perpendicular to flow axis 22 to permit rapid and convenient replacement of a worn valve seat.

Figure 7:
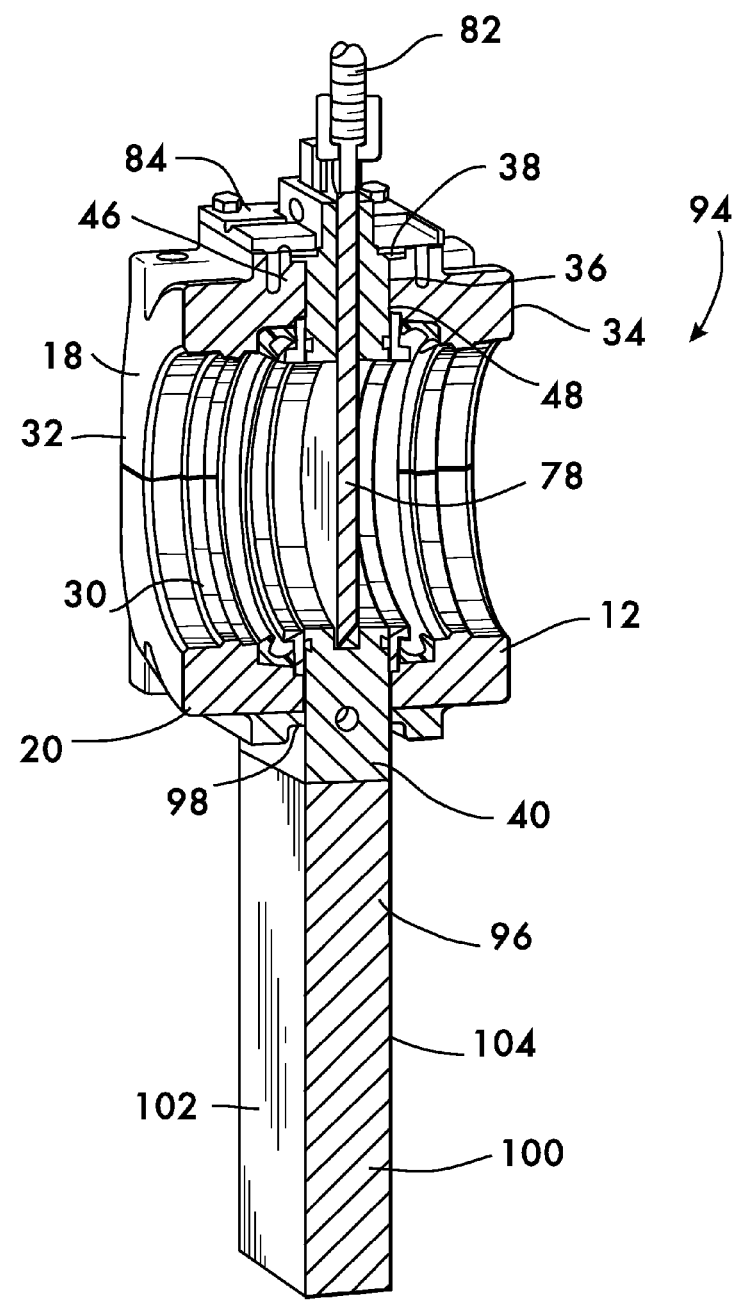
FIGS. 7-9 are partial sectional isometric views illustrating an example method of replacing a valve seat according to the invention.
Figure 8:
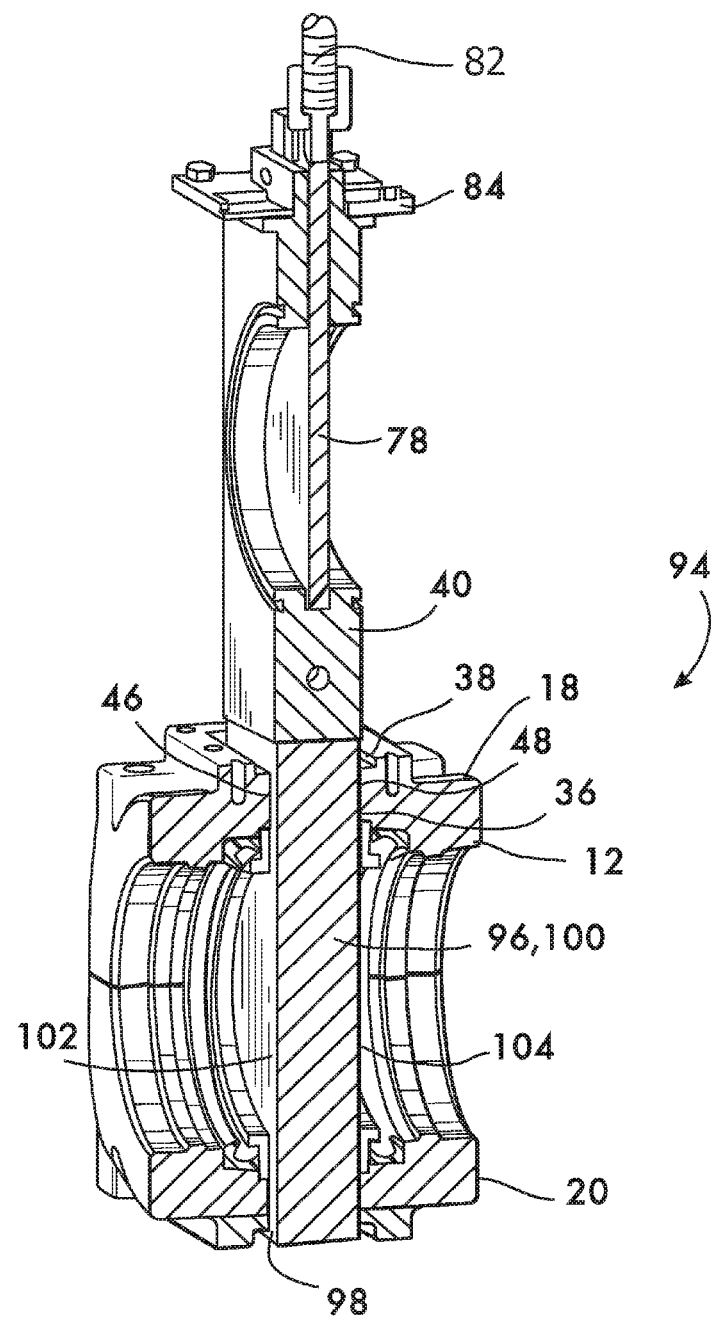
Figure 9:
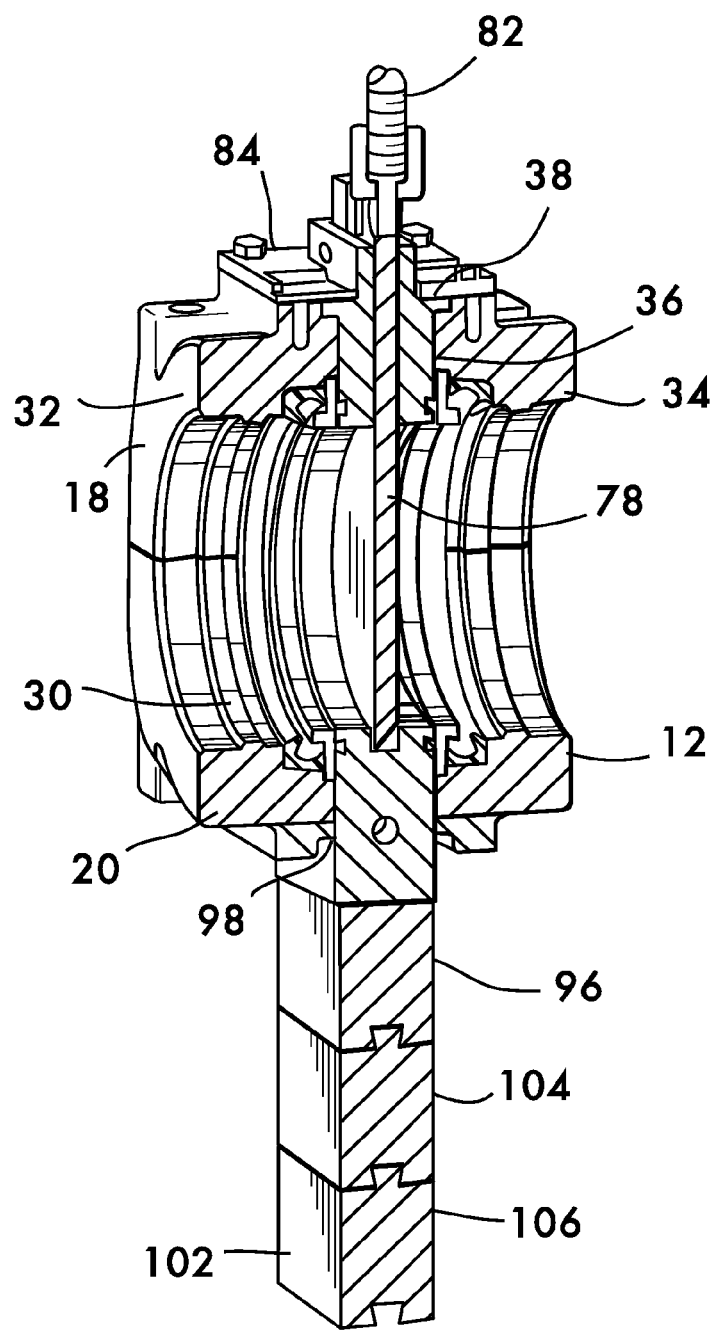

In another valve embodiment 94, shown in FIG. 7, replacement of a worn valve seat 40 is further facilitated through the use of a sealing body 96. Sealing body 96 permits replacement of the valve seat 40 without interrupting fluid flow to the valve 94. Valve 94 has a second opening 98 positioned in the second segment 20 opposite to the first opening 38. The second opening 98 provides access to cavity 36, and allows the sealing body 96 to be removably attached to the valve seat 40. In this example embodiment, the sealing body 96 comprises a rectangular block 100 having oppositely disposed sealing surfaces 102 and 104. As shown in FIG. 8, when the sealing body 96 is temporarily attached to the valve seat 40, and the valve seat is drawn out of the cavity 36 by the actuator 82 through opening 38 in the first segment 18, the sealing body 98 is drawn into the cavity 36 through the second opening 98 in the second segment 20. Sealing surfaces 102 and 104 of the block 100 sealingly engage the housing 12, namely walls 46 and 48, thereby closing the valve 94. The valve seat 40 is then released from the sealing body 96, and may be replaced as described above, with the additional step of attaching the valve seat 40 to the sealing body 96. When the new valve seat 40 is inserted into the cavity 36 through opening 38 in the segment 18 the sealing body 96 (block 100 in this example) is forced out of the cavity through the opening 98 in the segment 20. The sealing body may then be disengaged from the new valve seat 40. Temporary attachment of the valve seat 40 to the sealing body 98 may be effected through friction of contacting surfaces of interengaging parts, aligned holes and pins, spring biased detents, or dovetail joints for example. It may also be advantageous if the sealing body 96 comprises a plurality of interlocking portions 106 removably attachable to one another as shown in FIG. 9. This allows the sealing body to be assembled and drawn into the cavity 36 a portion at a time, and is useful when space is not available to accommodate a full sized block 100 for example. Portions 106 may be temporarily joined to one another using dovetail joints as shown, or using friction of contacting surfaces of interengaging parts, spring biased detents, and aligned holes and pins to cite a few examples.

Figure 10:
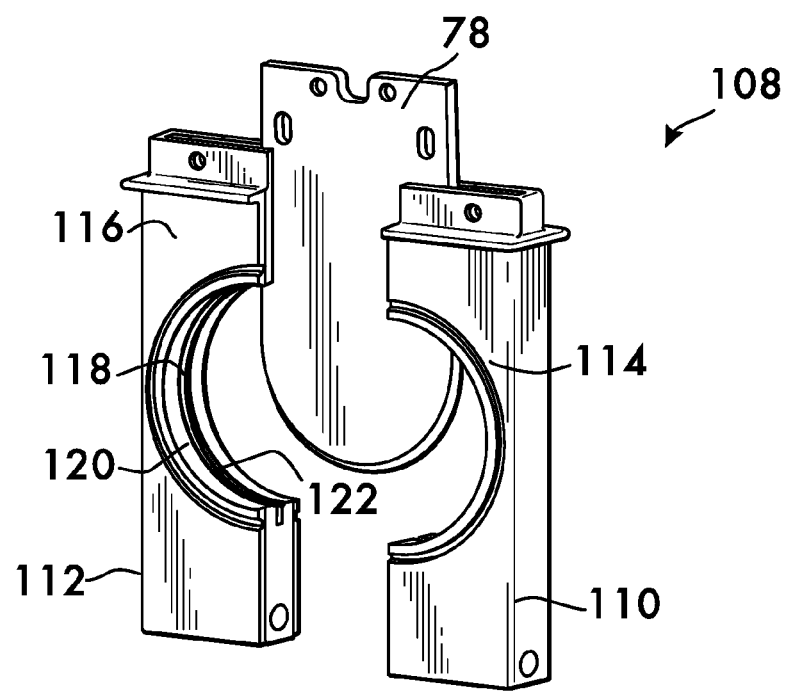
FIG. 10 is a partial isometric sectional view of an example embodiment of a valve seat according to the invention.

As shown in FIG. 10, a valve seat 108 can be formed from a plurality of independent piece parts that cooperate with one another. In this example, valve seat 108 comprises first and second piece parts 110 and 112 positionable within the cavity 36 of example valve embodiments 10 instead of seat 40 (see FIG. 2) and valve embodiment 94 (see FIG. 7). The first and second piece parts 110, 112 comprise first and second sealing surfaces 114 and 116 oppositely disposed from one another and sealingly engageable with the housing 12. The first and second piece parts 110 and 112 further comprise sealing surfaces 118 and 120 positioned in facing relation to one another and defining a slot 122 therebetween. The slot receives the gate 78 in sealing relation.

Although the example embodiments shown pertain to gate valves, the invention is also applicable to other types of valves. As shown in FIG. 11, a body 124 is rotatably mounted within a valve seat 126, the body being rotatable about axis 128 between an open position, and a closed position sealingly engaging the valve seat 126. In this example the valve closing member comprises a disk 130 characteristic of the well-known "butterfly" valve. Like valve seat 40 described above, the valve seat 126 can be inserted into and removed from the cavity 36 of a housing 12 (see FIG. 1) through an opening 38 (see FIG. 2) as described above when the disk 130 is in the closed position. Because the valve closing member is actuated by rotation about axis 128, the actuator (jackscrew 82) which is used to draw the valve seat 126 from the housing cannot also be used to actuate the valve. Therefore, a second actuator (hand lever 132 for example) is mounted on the housing to rotate the disk 130. Although a simple hand lever is shown, the second actuator could be a motorized gear train, or other form of power actuation.

What is claimed is:

1. A valve, comprising:
   a housing having an inlet and an outlet;
   a cavity positioned within said housing between said inlet and said outlet, a first opening in said housing providing access to said cavity, said cavity being defined by first and second walls positioned within said housing and oriented transversely to a flow axis extending from said inlet to said outlet, said first and second walls being in spaced relation to one another, each said wall having a surface facing toward and sealingly engaged with a valve seat; said valve seat positioned within said cavity and sealingly engaging said housing, said valve seat being insertable into and removable from said cavity through said first opening, said valve seat comprising first and second sealing surfaces positioned in facing relation to one another and defining a slot therebetween;
   a valve closing member mounted within said valve seat and movable relatively thereto between an open position and a closed position sealingly engaging said valve seat, said valve closing member comprising a gate slidably movable within said slot between said open and closed positions, said gate being oriented transversely to said flow axis and having first and second oppositely disposed faces respectively sealingly engaging said first and second sealing surfaces of said valve seat;
   an actuator mounted on said housing and engageable with said valve seat, a strap attached to said gate, said strap surrounding said valve seat for retaining said valve seat to said gate thereby attaching said valve seat to said actuator to facilitate removal thereof from said cavity, said actuator also being engageable with said valve closing member separately from said valve seat for moving said valve closing member between said open and said closed positions; wherein
   actuation of said actuator removes said valve seat and said valve closing member from said cavity through said first opening when said valve seat is engaged with said actuator.

2. The valve according to claim 1, wherein said valve closing member comprises a gate slideably mounted within said valve seat, said gate being slidably movable between said open and said closed positions.

3. The valve according to claim 2, wherein said gate is pivotably attached to said actuator.

4. The valve according to claim 2, wherein said gate is slidingly attached to said actuator.

5. The valve according to claim 1, wherein said actuator comprises a jackscrew.

6. The valve according to claim 1, wherein said housing comprises a first segment defining said first opening and a second segment attached to said first segment, said first and second segments being attached to one another end to end and defining said inlet and said outlet and a flow axis extending therebetween.

7. The valve according to claim 6, wherein each of said first and second segments comprises first and second arcuate projections positioned on opposite sides of said segments, said first and second arcuate projections surrounding said flow axis and extending radially there toward.

8. The valve according to claim 6, wherein each of said first and second segments comprises first and second lugs projecting outwardly from opposite ends thereof, said lugs each having at least one hole for receiving a fastener for attaching said segments to one another.

9. The valve according to claim 8, wherein each of said first and second segments comprises:
   first and second groove portions positioned on opposite sides of said segments, each of said groove portions facing said flow axis;
   first and second gaskets respectively positioned within said first and second groove portions.

10. The valve according to claim 9, wherein said first and second groove portions of said first and second segments extend over interfacing surfaces of said first and second lugs of said first and second segments, said first and second gaskets extending along said first and second groove portions in said first and second lugs.

11. The valve according to claim 6, wherein:
    said inlet has an inner diameter;
    said valve seat defines an aperture having an inner diameter smaller than said inner diameter of said inlet thereby defining a sealing surface facing said inlet.

12. The valve according to claim 11, wherein said sealing surface comprises at least one projection extending toward said inlet.

13. The valve according to claim 6, wherein:
    said outlet has an inner diameter;
    said valve seat defines an aperture having an inner diameter smaller than said inner diameter of said outlet thereby defining a sealing surface facing said outlet.

14. The valve according to claim 13, wherein said sealing surface comprises at least one projection extending toward said outlet.

* * * * *